United States Patent
Perrot et al.

(10) Patent No.: US 12,537,405 B2
(45) Date of Patent: Jan. 27, 2026

(54) ROTOR AND ASSOCIATED ROTARY ELECTRIC MACHINE

(71) Applicant: GE ENERGY POWER CONVERSION TECHNOLOGY LIMITED, Warwicksire (GB)

(72) Inventors: Matthieu Perrot, Champigneulles (FR); Christophe Galmiche, Champigneulles (FR); Philippe Reibel, Champigneulles (FR)

(73) Assignee: GE ENERGY POWER CONVERSION TECHNOLOGY LIMITED, Warwicksire (GB)

( * ) Notice: Subject to any disclaimer, the term of this patent is extended or adjusted under 35 U.S.C. 154(b) by 280 days.

(21) Appl. No.: 18/231,113

(22) Filed: Aug. 7, 2023

(65) Prior Publication Data

US 2024/0072588 A1 Feb. 29, 2024

(30) Foreign Application Priority Data

Aug. 5, 2022 (EP) ..................................... 22189139

(51) Int. Cl.
*H02K 1/28* (2006.01)
(52) U.S. Cl.
CPC ..................................... *H02K 1/28* (2013.01)
(58) Field of Classification Search
CPC ............ H02K 1/28; H02K 5/10; H02K 1/276; H02K 2213/03
See application file for complete search history.

(56) References Cited

U.S. PATENT DOCUMENTS

| | | | |
|---|---|---|---|
| 2015/0026966 A1* | 1/2015 | Fang | H02K 15/03 29/598 |
| 2020/0112215 A1* | 4/2020 | Galmiche | H02K 1/28 |
| 2021/0202974 A1 | 7/2021 | Roy et al. | |

FOREIGN PATENT DOCUMENTS

| | | |
|---|---|---|
| DE | 19956042 A1 | 5/2001 |
| DE | 102012110157 A1 | 6/2014 |
| DE | 102019202568 A1 | 8/2020 |
| DE | 102019208099 A1 | 12/2020 |
| EP | 0509119 A1 | 10/1992 |
| EP | 0609645 A1 | 8/1994 |

(Continued)

OTHER PUBLICATIONS

Extended European Search Report for EP Application No. 22189139.3 dated Jan. 20, 2023, 9 pages.

*Primary Examiner* — Thomas Truong
(74) *Attorney, Agent, or Firm* — Wood IP, LLC; Theodore A. Wood

(57) ABSTRACT

The rotor for rotary electric machine has a magnetic mass clamped between two compaction elements, and tie rods passing through the magnetic mass and connecting the two compaction elements, at least a first compaction element has as many through holes as tie rods, each through hole of the first compaction element has a counterbore on one side opposite to the side in contact with the magnetic mass, each tie rod passing through a different through hole of the first compaction element and being fixed in the said through hole by a fixing element of the first compaction element logged in the counterbore, characterized in that each fixing element and the associated counterbore cooperate so that each fixing element is in contact with the counterbore in a radial direction of the rotor.

13 Claims, 5 Drawing Sheets

(56) References Cited

FOREIGN PATENT DOCUMENTS

| EP | 3627659 A1 | 3/2020 | |
|---|---|---|---|
| JP | 2021042852 A | 3/2021 | |
| WO | WO-2020245109 A1 * | 12/2020 | ............. H02K 15/03 |

* cited by examiner

ROTOR AND ASSOCIATED ROTARY ELECTRIC MACHINE

CROSS-REFERENCE TO RELATED APPLICATIONS

This application claims priority to European Patent Application Serial Number 22189139.3, filed Aug. 5, 2022, which is herein incorporated by reference.

FIELD OF INVENTION

The present invention concerns electrical rotating machines and relates more particularly to a rotor for such electrical rotating machines.

The present invention relates more particularly to rotor implemented in a wet saturated gas (WSG) environment and a machine comprising such a rotor.

BACKGROUND OF THE INVENTION

The documents EP0609645, DE19956042, EP0509119, EP3627659, JP2021042852 disclose a rotor with a non-through shaft for a rotary electric machine, comprising a magnetic mass sandwiched between two half shafts.

The rotor comprises tie rods passing through the magnetic mass and connecting and the two half shafts.

Each half shaft comprises through holes.

At least one extremity of each tie rod comprises a thread cooperating with a taper nut localized on a side of the half shaft opposite to the side of the half shaft in contact with the magnetic mass.

The nuts at the extremities of each tie rod and resting against the free side of the half shafts maintain compacted the magnetic mass between the two half shafts.

Each tie rod is under a tensile or a traction load.

During machining of the thread on each tie rod, a groove is machined at the end of the thread such that the section of each tie rod is reduced.

Further, the nuts at the extremities of each tie rod are only maintained in an axial direction of the rotor on the free side of a half shaft by friction forces.

The nuts are not maintained in a radial direction of the rotor so that when the rotor is implemented in a high speed rotating machine, for example for a peripherical speed of the rotor greater than 200 m/s, each nut may be subjected to an acceleration greater than 10000 times the gravity so that the generated centrifugal force is greater than the friction forces maintaining each nut, each nut is projected in a radial direction oriented outside the rotor so that each tie rod is bent.

As the section of each tie rod is reduced at the end of the thread, cracks are susceptible to appear in the groove at the end of the thread and damage the tie rods when the tie rod is bent.

To avoid the formation of cracks, the tie rods are made of high resistance steel having, for example an elastic limit (yield strength) above 1000 MPa.

However, in a WSG environment, the use of high resistance steel having an elastic limit above 830 MPa is not recommended.

In a WSG environment comprising H2 or H2S gas, such gases corrode grain seals of the high resistance steel so that tie rods are subjected to cracks leading to damaging or destroying the rotor.

One solution is to reduce the compaction force exerted by the tie rods on the magnetic mass to decrease the constraints in the tie rods in order to use standard steels.

The reduction of the compaction force may unpack the magnetic mass so that the rotor is not rigid enough particularly when the rotor is operating at high rotation speed.

It is therefore proposed to remedy the disadvantage related to rotors implemented in a WSG environment according to the prior art.

SUMMARY OF INVENTION

In view of the foregoing, the invention proposes a rotor for rotary electric machine comprising a magnetic mass clamped between two compaction elements, and tie rods passing through the magnetic mass and connecting the two compaction elements, at least a first compaction element comprising as many through holes as tie rods, each through hole of the first compaction element comprising a counterbore on one side opposite to the side in contact with the magnetic mass, each tie rod passing through a different through hole of the first compaction element and being fixed in the said through hole by a fixing element of the first compaction element logged in the said counterbore.

Each fixing element and the associated counterbore cooperate so that each fixing element is in contact with the counterbore in a radial direction of the rotor.

Preferably, the second compaction element comprises as many through holes as tie rods, each through hole of the second compaction element comprising a counterbore on one side opposite to the side in contact with the magnetic mass, each tie rod passing through a different through hole of the second compaction element and being fixed in the said through hole by a fixing element of the second compaction element and logged in the said counterbore.

Advantageously, each fixing element of the first compaction element and each fixing element of the second compaction element are identical.

Preferably, each of the first and second compaction elements comprises a half shaft, the half shafts forming a non-through shaft.

Advantageously, each of the first and second compaction elements comprises a compaction plate, the rotor comprising a shaft passing through a central hole of the magnetic mass and a central hole of each compaction plate.

Preferably, each fixing element comprises a conical nut and the associated counterbore of the first compaction element comprises a conical counterbore so that the lateral surface of the conical nut is recessed in the lateral surface of the conical counterbore and an axial gap separates an extremity surface of the conical nut from a bottom surface at the bottom of the conical counterbore, the greater diameter of the conical counterbore being on the side of the compaction element opposite to the side in contact with the magnetic mass and the extremity surface of the conical nut being the surface facing the bottom surface, the conical nut comprising a central tapered hole and the associated tie rod comprising a thread cooperating with the central tapered hole of the conical nut.

Advantageously, the central threaded hole of each conical nut is a blind threaded hole.

Preferably, the lateral surface of each conical nut or the lateral surface of each conical counterbore comprises at least one groove and a seal logged into the groove.

Advantageously, the extremity surface of each conical nut or the bottom surface of each conical counterbore comprises at least one groove and a seal logged into the groove.

Preferably, each conical nut comprises a cylindrical part comprising the central tapered hole and comprises a second conical nut, the cylindrical part being fixed in a central hole of the second conical nut.

Advantageously, the length of the second conical nut is at least equal to 80% of the length of the cylindrical part.

Preferably, the cylindrical part comprises a thread on its lateral surface and the central hole of the second conical nut is tapered, the thread of the cylindrical part cooperating with the tapered central hole of the second conical nut.

Advantageously, each fixing element comprises a nut and the associated counterbore of the first compaction element is cylindrical and separated by a radial gap from the nut, the nut comprising a central tapered hole and the associated tie rod comprising a thread cooperating with the central tapered hole of the nut, the fixing element further comprising a wedge inserted in the gap and in contact with the nut and the counterbore.

Preferably, the counterbore comprises a bottom surface at the bottom of the counterbore, the surface of the nut facing the bottom surface or the bottom surface comprising at least one groove and a seal logged into the groove.

Another object of the invention relates to a rotary electric machine comprising a rotor as defined above.

BRIEF DESCRIPTION OF THE DRAWINGS

Other characteristics and advantages of the invention will emerge on reading the following description of embodiments of the invention, provided solely by way of non-limiting examples and with reference to the drawings in which.

DETAILED DESCRIPTION OF INVENTION

Figure 1:
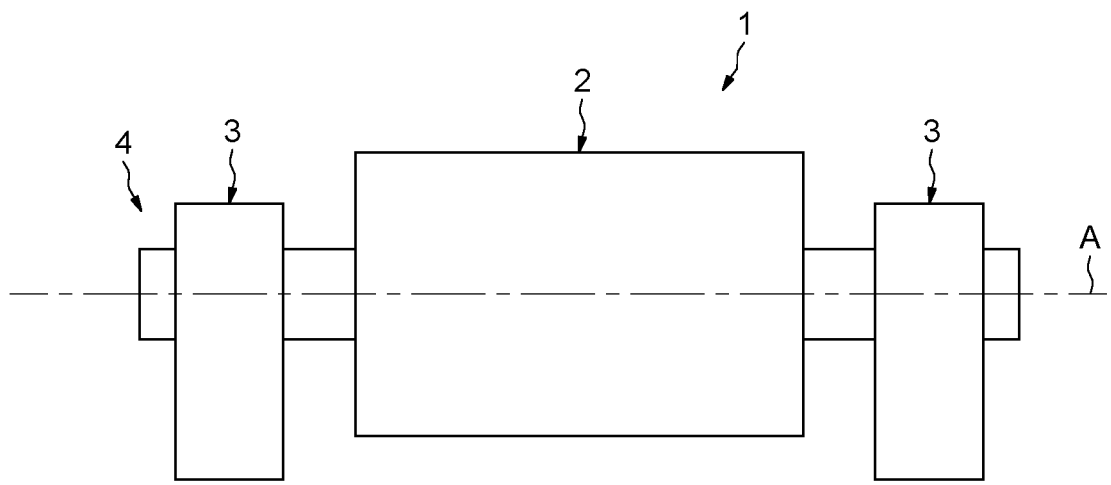
FIG. 1 illustrates an example of a rotary electric machine according to the present disclosure.

Reference is made to FIG. 1 which illustrates an embodiment of a rotary electric machine 1 comprising a stator 2, bearings 3 and a rotor 4 inserted into the stator 2 and the bearings 3.

The rotor 4 comprises an axis A coincident with the axis of rotation of the rotor 4.

Figure 2:
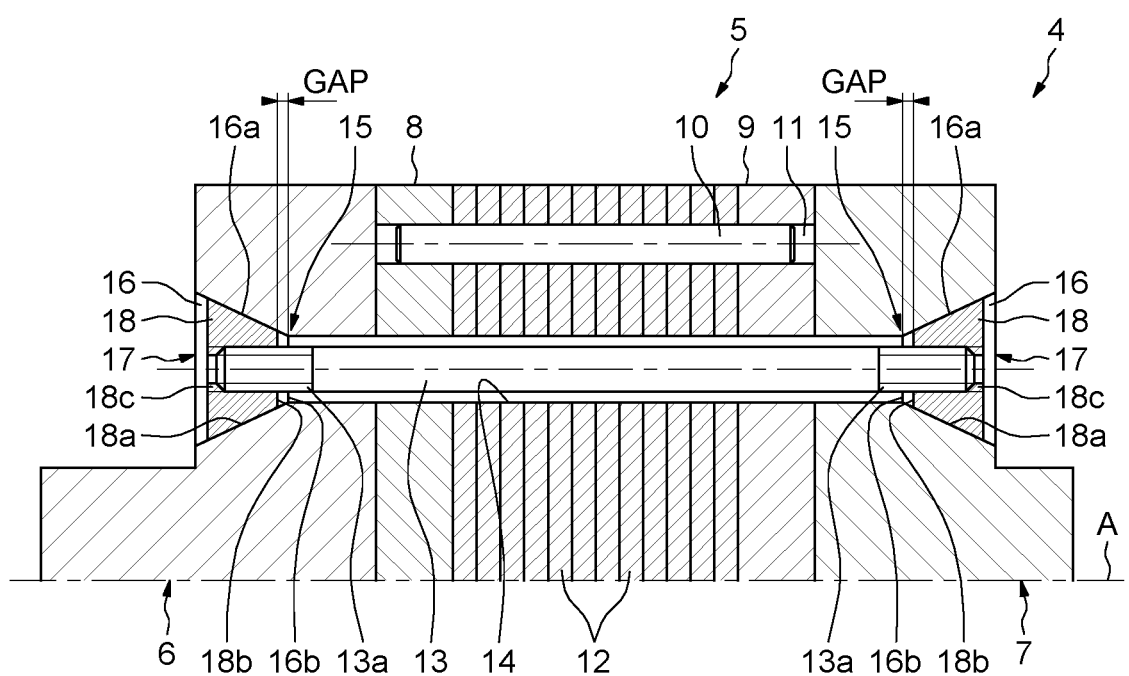
FIG. 2 illustrates a first embodiment of a rotor according to the present disclosure.

FIG. 2 illustrates a partial section in an axial direction of a first embodiment of the rotor 4.

The rotor 4 comprises a magnetic mass 5 clamped between two identical compaction elements, each compaction element comprising a half shaft 6, 7.

In variant, the compaction elements may be different one from another.

Both half shafts 6, 7 form a non-through shaft into the magnetic mass 5.

The magnetic mass 5 comprises a short-circuit disc 8, 9 at each end of the magnetic mass 5 and conductive bars 10 logged in axial housings 11 uniformly provided in the magnetic mass 5 along a diameter of the magnetic mass 5.

The two short-circuit discs 8, 9 and conductive bars 10 form a squirrel cage, the rotary electric machine 1 being an asynchronous rotary electric machine.

In another embodiment, the conductive bars 10 are replaced by coils and the short-circuit discs 8, 9 are replaced by collectors to form a synchronous rotary electric machine.

The magnetic mass 5 further comprises compacted magnetic sheets 12 clamped between the two short-circuit discs 8, 9.

The thickness of the magnetic sheets 12 is preferably less than 2 mm, preferably 0.65 mm, for example 0.5 mm.

Alternatively, the magnetic mass 5 comprises compacted metal plates replacing the compacted magnetic sheets, the thickness of the metal plates is preferably greater than 5% of the exterior diameter of the magnetic mass 5.

In another embodiment, the rotor 4 is a monobloc rotor.

The rotor 4 further comprises tie rods 13 passing through housings 14 of the rotor 4 uniformly provided in the rotor 4 along a diameter of the rotor 4 and connecting the two half shafts 6, 7.

Each half shaft 6, 7 comprises as many through holes 15 as tie rods 13, each through hole 15 of the half shaft 6, 7 comprising a counterbore on one side of the compaction element opposite to the side in contact with the magnetic mass 5.

Each tie rod 13 passes through a different through hole 15 of the half shaft 6, 7 and is fixed in the said through hole 15 by a fixing element 17 logged in the said counterbore.

The fixing element 17 and the associated counterbore cooperate so that each fixing element 17 is in contact with the counterbore in a radial direction of the rotor 4.

As the fixing element 17 is in contact with the counterbore in a radial direction of the rotor 4, the fixing element 17 does not move along a radial direction of the rotor 4 under the effect of the centrifugal force avoiding bending stress by deformation of the tie-rods 13 extremity so that high resistance steel may be used in a WSG environment without reducing the speed of the rotor 4 to decrease the centrifugal force or without reducing the compaction force exerted by the tie rods 13 on the magnetic mass 5.

Each fixing element 17 comprises a conical nut 18 and the associated counterbore comprises a conical counterbore 16.

The greater diameter of the conical counterbore 16 is on the side of the compaction element opposite to the side in contact with the magnetic mass 5.

The conical nut 18 and the associated counterbore 16 are designed so that the lateral surface 18a of the conical nut 18 is recessed in the lateral surface 16a of the conical counterbore 16 and an axial gap ("GAP") separates an extremity surface 18b of the conical nut 18 from a bottom surface 16b at the bottom of the conical counterbore 16.

The extremity surface 18b of the conical nut 18 is the surface facing the bottom surface 16b.

The conical nut 18 comprises a through central tapered hole 18c and the associated tie rod 13 comprising a thread 13a cooperating with the central tapered hole 18c.

Each tie rod 13 may further comprise a groove (not represented) at the end of the thread 13a reducing the section of the tie rod 13.

As the fixing element 17 avoids bending stress by deformation of the tie-rods 13, no cracks appear in the reduced section.

In variant, one of the both half shafts 6, 7 comprises the through hole 15 and the other half shaft comprises a tapered through hole, one end of each tie rod 13 being fixed in the through hole 15 by the fixing element 17 and the other end of each tie rod 13 comprising a thread cooperation with the tapered through hole.

Figure 3:
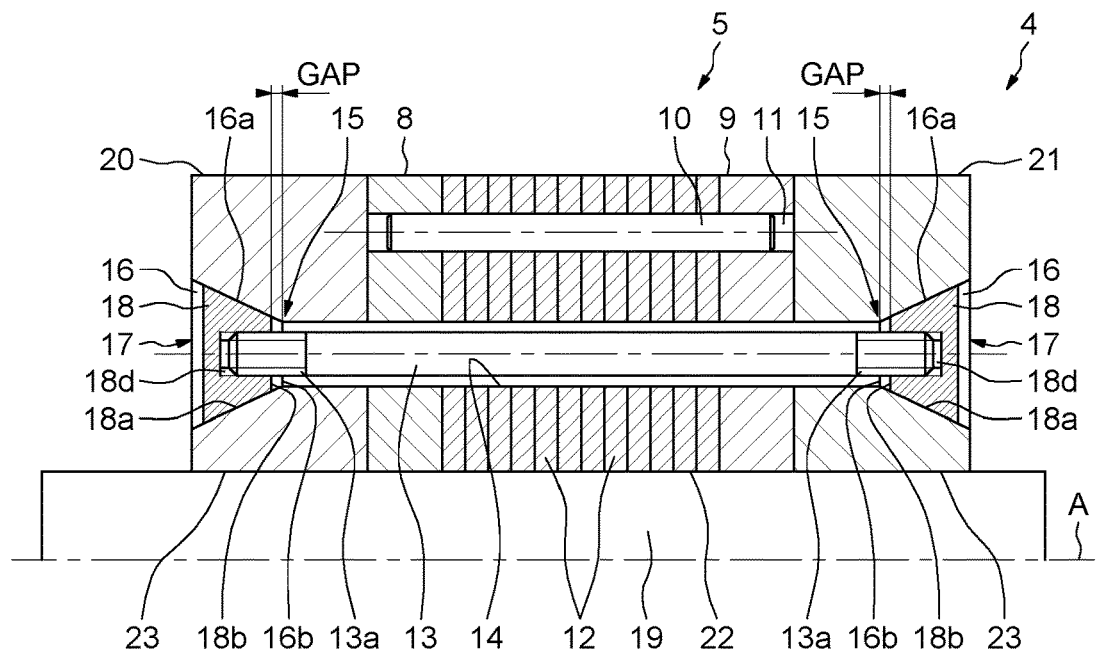
FIG. 3 illustrates a second embodiment of the rotor according to the present disclosure.

FIG. 3 illustrates a partial section in an axial direction of a second embodiment of the rotor 4.

This embodiment of the rotor 4 is different of the first embodiment of the rotor 4 illustrated on FIG. 2 in that the rotor 4 comprises a through shaft 19, the compaction elements comprising compaction plates 20, 21.

The shaft 19 passes through a central hole 22 of the magnetic mass 5 and central holes 23 of the compaction plates 20, 21.

The conical nut 18 comprises a blind threaded hole 18d replacing the through central tapered hole 18c, the blind threaded hole 18d cooperating with the thread 13a of the associated tie rod 13.

In variant, one of the compaction plates 20, 21 comprises the through hole 15 and the other compaction plate comprises a tapered through hole, one end of each tie rod 13 being fixed in the through hole 15 by the fixing element 17 and the other end of each tie rod 13 comprising a thread cooperation with the tapered through hole.

Figure 4:
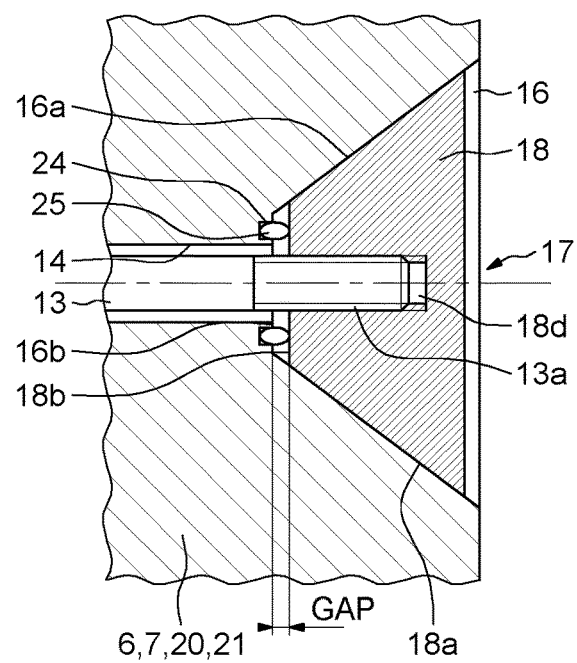
FIG. 4 illustrates an embodiment of a fixing element according to the present disclosure.

FIG. 4 illustrates a partial section in an axial direction of a third embodiment of the fixing element 17.

The fixing element comprises the conical nut 18 comprising the blind threaded hole 18d as illustrated on FIG. 3.

The bottom surface 16b of the conical counterbore 16 comprises one groove 24 and a seal 25 logged into the groove 24.

The groove 24 and the seal 25 are designed so that the seal 25 compressed partially or totally between the groove 24 and the extremity surface 18b of the conical nut 18 avoids that gas infiltrates into the housing 14 of the tie rod 13 and infiltrates into the magnetic mass 5.

The bottom surface 16b may comprise more than one groove 24, for example two grooves, each groove lodging a seal.

In variant, the extremity surface 18b of the conical nut 18 comprises the groove 24.

Figure 5:
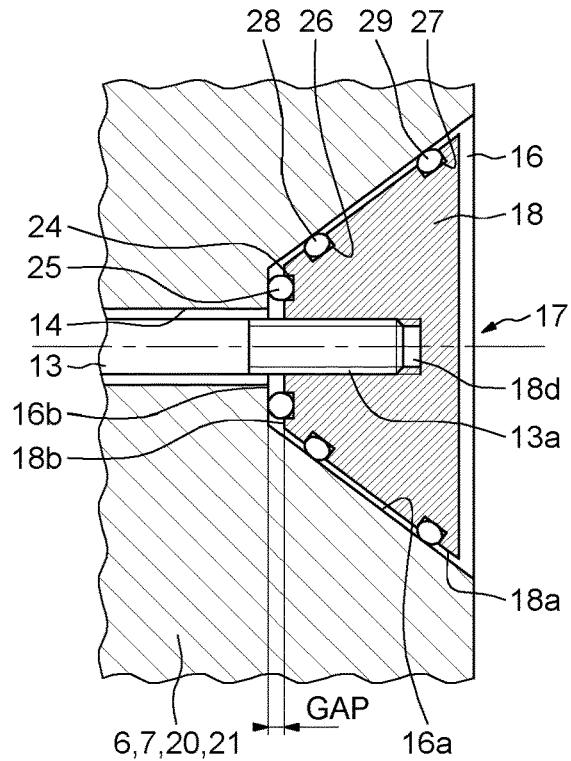
FIG. 5 illustrates another embodiment of the fixing element according to the present disclosure.

FIG. 5 illustrates a partial section in an axial direction of a fourth embodiment of the fixing element 17.

The fixing element comprises the conical nut 18 comprising the blind threaded hole 18d as illustrated on FIG. 3.

The extremity surface 18b of the conical nut 18 comprises the groove 24 lodging the seal 25.

The lateral surface 18a of the conical nut 18 comprises two grooves 26, 27, each groove lodging a seal 28, 29.

The conical nut 18, the grooves 26, 27 and the seals 28, 29 are designed so that when the conical nut 18 is inserted into the conical counterbore 16, the seals 28, 29 compressed totally or partially between lateral surface 18a of the conical nut 18 and the lateral surface 16a of the conical counterbore 16 avoid that gas infiltrates into the housing 14 of the tie rod 13 and infiltrates into the magnetic mass 5.

In variant, the lateral surface 16a of the conical counterbore 16 comprises the grooves 26, 27.

In variant, the conical nut 18 comprises only the grooves 26, 27 on the lateral surface 18a.

In another variant, the conical nut 18 comprises one or more than two grooves on the lateral surface 18a, each groove lodging a seal.

Figure 6:
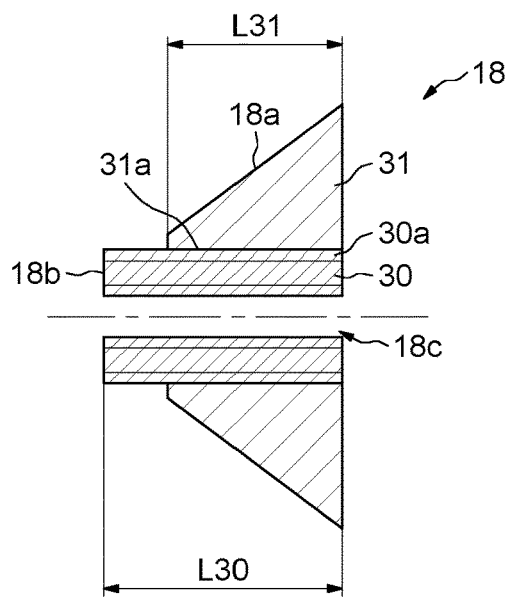
FIG. 6 illustrates an embodiment of a conical nut according to the present disclosure.

FIG. 6 illustrates a partial section in an axial direction of a fifth embodiment of the conical nut 18.

The conical nut 18 comprises a cylindrical part 30 comprising the central tapered hole 18c and the extremity surface 18b, and comprises a second conical nut 31 comprising the lateral surface 18a.

The cylindrical part 30 is fixed in a central hole 31a of the second conical nut 31.

The cylindrical part 30 may comprise a thread 30a on its lateral surface and the central hole 31a of the second conical nut may be tapered, the thread 30a of the cylindrical part 30 cooperating with the tapered central hole 31a of the second conical nut 31.

The length L31 of the second conical nut 31 may be at least equal to 80% of the length L30 of the cylindrical part 30 so that the grip length of the tapered central hole 31a on the thread 30a is enough to ensure the stability of the assembly of the second conical nut 31 on the cylindrical part 30.

Figure 7:
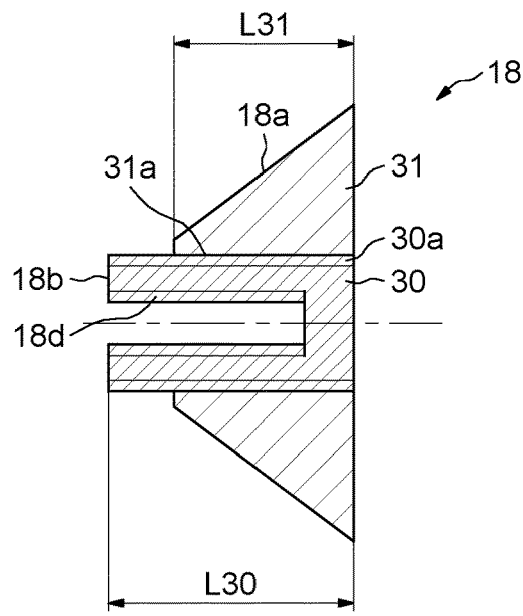
FIG. 7 illustrates another embodiment of the conical nut according to the present disclosure.

FIG. 7 illustrates a partial section in an axial direction of a sixth embodiment of the conical nut 18.

This embodiment differs from the fifth embodiment illustrated on FIG. 6 on that the cylindrical part 30 comprises the blind threaded hole 18d.

The extremity surface 18b may comprise the groove 24 lodging the seal 25 as illustrated on FIG. 5 and the lateral surface 18a may comprise at least one of the grooves 26, 27 lodging the seals 28, 29 as illustrated on FIG. 5.

In variant, the extremity surface 18b comprises the groove 24 lodging the seal 25 as illustrated on FIG. 5 or the lateral surface 18a comprises at least one of the grooves 26, 27 lodging the seals 28, 29 as illustrated on FIG. 5.

Figure 8:
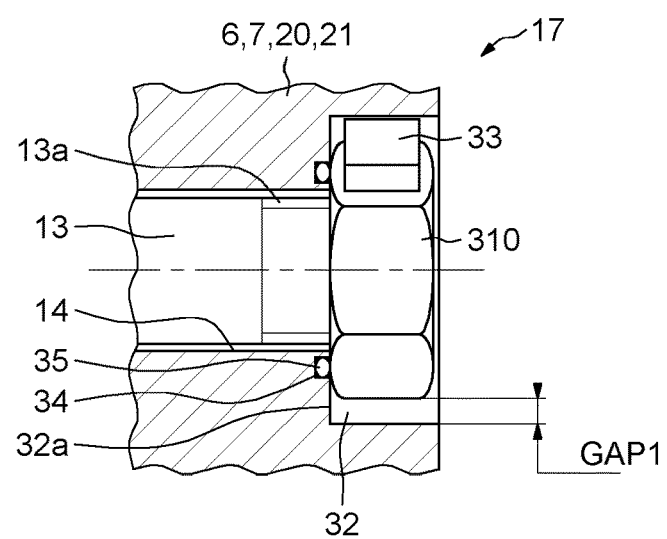
FIG. 8 illustrates another embodiment of the fixing element according to the present disclosure.
Figure 9:
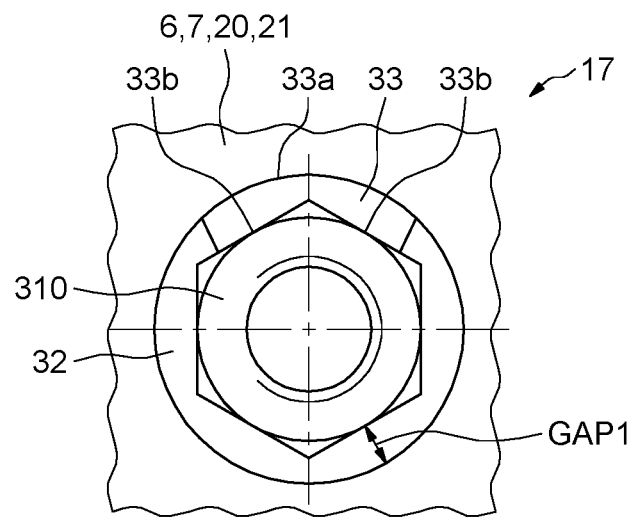
FIG. 9 illustrates yet another embodiment of the fixing element according to the present disclosure.

FIGS. 8 and 9 illustrate a partial section in an axial direction and a lateral partial view of a seventh embodiment of the fixing element 17.

Each fixing element 17 comprises a nut 310 and the associated counterbore comprises a cylindrical counterbore 32.

The nut 310 may be a hexagonal nut.

The nut 310 is separated from the cylindrical counterbore 32 by a gap GAP1 design to permit to screw and unscrew the nut 310.

The nut 310 comprises a central tapered hole cooperating with the thread 13a of the tie rod 13.

The fixing element 17 further comprises a wedge 33 inserted in the gap GAP1 and in contact with the nut 310 and the counterbore 32.

The wedge 33 is designed and inserted in the gag GAP1 so that the nut 310 does not move along a radial direction of the rotor 4 under the effect of the centrifugal force avoiding deformation of the end of the tie rod 13 to avoid bending stress in the said end.

The wedge 33 comprises a cylindrical outer part 33a in contact with the counterbore 32 and two inner faces 33b in contact with a peripheral surface of the nut 310.

The bottom surface 32a of the cylindrical counterbore 32 may comprise a groove 34 lodging a seal 35 so that gas does not infiltrate into the housing 14 and into the magnetic mass 5.

In variant, the surface of the nut 310 facing the bottom surface 32a comprises the groove 34 lodging the seal 35.

Figure 10:
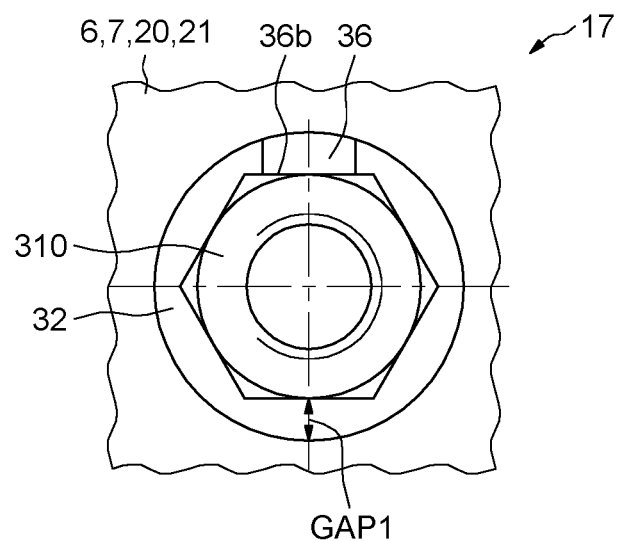
FIG. 10 illustrates another embodiment of the fixing element according to the present disclosure.

FIG. 10 illustrates a lateral partial view of an eighth embodiment of the fixing element 17.

This embodiment differs from the seventh embodiment illustrates on FIG. 9 in that the wedge 36 comprises only a face 36b in contact with the peripheral surface of the nut 310.

The invention claimed is:

1. A rotor for rotary electric machine comprising:
a magnetic mass clamped between two compaction elements, and tie rods passing through the magnetic mass and connecting the two compaction elements,
at least a first compaction element comprising as many through holes as tie rods, each through hole of the first compaction element comprising a counterbore on one side that is opposite to the side in contact with the magnetic mass,
wherein each tie rod passing through a different through hole of the first compaction element and being fixed in the through hole by a fixing element of the first compaction element logged in the counterbore, and wherein each fixing element and the associated counterbore cooperate so that each fixing element is in contact with the counterbore in a radial direction of the rotor wherein each fixing element comprises a conical nut and the associated counterbore of the first compaction element comprises a conical counterbore so that the lateral surface of the conical nut is recessed in the lateral surface of the conical counterbore and an axial gap separates an extremity surface of the conical nut from a bottom surface at the bottom of the conical counterbore, the greater diameter of the conical counterbore being on the side of the compaction element opposite to the side in contact with the magnetic mass and the extremity surface of the conical nut being the surface facing the bottom surface, the conical nut comprising a central tapered hole and the associated tie rod comprising a thread cooperating with the central tapered hole of the conical nut.

2. The rotor according to claim 1, wherein the second compaction element comprises as many through holes as tie rods, each through hole of the second compaction element comprising a counterbore on one side opposite to the side in contact with the magnetic mass, each tie rod passing through a different through hole of the second compaction element and being fixed in the said through hole by a fixing element of the second compaction element and logged in the said counterbore.

3. The rotor according to claim 2, wherein each fixing element of the first compaction element and each fixing element of the second compaction element are identical.

4. The rotor according to claim 1, wherein each of the first and second compaction elements comprises a half shaft, the half shafts forming a non-through shaft.

5. The rotor according to claim 1, wherein the central threaded hole of each conical nut is a blind threaded hole.

6. The rotor according to claim 5, wherein the lateral surface of each conical nut or the lateral surface of each conical counterbore comprises at least one groove and a seal logged into the groove.

7. The rotor according to claim 5, wherein the extremity surface of each conical nut or the bottom surface of each conical counterbore comprises at least one groove and a seal logged into the groove.

8. The rotor according to claim 1, wherein each conical nut comprises a cylindrical part comprising the central tapered hole and comprises a second conical nut, the cylindrical part being fixed in a central hole of the second conical nut.

9. The rotor according to claim 8, wherein the length of the second conical nut is at least equal to 80% of the length of the cylindrical part.

10. The rotor according to claim 8, wherein the cylindrical part comprises a thread on its lateral surface and the central hole of the second conical nut is tapered, the thread of the cylindrical part cooperating with the tapered central hole of the second conical nut.

11. A rotary electric machine comprising a rotor according to claim 1.

12. A rotor for rotary electric machine comprising:
a magnetic mass clamped between two compaction elements, and tie rods passing through the magnetic mass and connecting the two compaction elements,
at least a first compaction element comprising as many through holes as tie rods, each through hole of the first compaction element comprising a counterbore on one side that is opposite to the side in contact with the magnetic mass,
wherein each tie rod passing through a different through hole of the first compaction element and being fixed in the through hole by a fixing element of the first compaction element logged in the counterbore, wherein each fixing element and the associated counterbore cooperate so that each fixing element is in contact with the counterbore in a radial direction of the rotor, and wherein each fixing element comprises a nut and the associated counterbore of the first compaction element is cylindrical and separated by a radial gap from the nut, the nut comprising a central tapered hole and the associated tie rod comprising a thread cooperating with the central tapered hole of the nut, the fixing element further comprising a wedge inserted in the gap and in contact with the nut and the counterbore.

13. The rotor according to claim 12, wherein the counterbore comprises a bottom surface at the bottom of the counterbore, the surface of the nut facing the bottom surface or the bottom surface comprising at least one groove and a seal logged into the groove.

* * * * *